(12) United States Patent
Evans et al.

(10) Patent No.: US 10,278,366 B2
(45) Date of Patent: May 7, 2019

(54) ANIMAL LEASH

(71) Applicants: Scott Evans, Jacksonville, NC (US); David A Pomeroy, Pahrump, NV (US)

(72) Inventors: Scott Evans, Jacksonville, NC (US); David A Pomeroy, Pahrump, NV (US)

(73) Assignee: Edge-Works Manufacturing Company, Burgaw, NC (US)

( * ) Notice: Subject to any disclaimer, the term of this patent is extended or adjusted under 35 U.S.C. 154(b) by 157 days.

(21) Appl. No.: 15/359,715

(22) Filed: Nov. 23, 2016

(65) Prior Publication Data
US 2017/0142934 A1     May 25, 2017

Related U.S. Application Data

(60) Provisional application No. 62/259,892, filed on Nov. 25, 2015.

(51) Int. Cl.
| | | |
|---|---|---|
| *A01K 27/00* | (2006.01) | |
| *A41F 9/00* | (2006.01) | |
| *H02J 50/80* | (2016.01) | |
| *H02J 50/12* | (2016.01) | |
| *H02J 50/40* | (2016.01) | |
| *H02J 7/02* | (2016.01) | |
| *H02J 50/10* | (2016.01) | |

(52) U.S. Cl.
CPC .......... *A01K 27/003* (2013.01); *A01K 27/005* (2013.01); *A01K 27/008* (2013.01); *A41F 9/002* (2013.01); *H02J 7/025* (2013.01); *H02J 50/10* (2016.02); *H02J 50/12* (2016.02); *H02J 50/40* (2016.02); *H02J 50/80* (2016.02)

(58) Field of Classification Search
CPC ..... A01K 27/00; A01K 27/003; A01K 27/008
USPC ................. 119/769, 792, 793, 795, 770, 772
See application file for complete search history.

(56) References Cited

U.S. PATENT DOCUMENTS

| | | | | |
|---|---|---|---|---|
| 5,233,942 A * | 8/1993 | Cooper | ................ | A01K 27/008 119/792 |
| 6,932,027 B1* | 8/2005 | Whitney | ................ | A01K 27/00 119/770 |
| 8,413,613 B1* | 4/2013 | Smith | .................. | A01K 27/003 119/797 |
| 9,807,980 B2* | 11/2017 | Arnold | ................. | A01K 27/003 |
| 2004/0112303 A1* | 6/2004 | Moulton, III | .......... | A01K 27/00 119/795 |
| 2013/0228140 A1* | 9/2013 | Stein | .................... | A01K 27/003 119/770 |
| 2013/0340687 A1* | 12/2013 | Palladino | ............... | A01K 27/00 119/793 |
| 2016/0135430 A1* | 5/2016 | Noonan | ............... | A01K 27/004 119/797 |

* cited by examiner

*Primary Examiner* — David J Parsley
*Assistant Examiner* — Danielle A Clerkley
(74) *Attorney, Agent, or Firm* — Christina Chamberlain; Stephen M. Kepper; Intellectual Property Consulting, LLC

(57) ABSTRACT

A leash with a non-elastomeric extendable portion; an elastomeric extendable portion; and a storage pouch. The elastomeric extendable portion is connected to the non-elastomeric portion and the non-elastomeric extendable portion is folded or rolled several turns upon itself. The storage pouch holds the non-elastomeric extendable portion in the folded or rolled relationship of its turns.

4 Claims, 9 Drawing Sheets

ANIMAL LEASH

RELATED APPLICATIONS

This application claims priority to U.S. Provisional Application No. 62/259,852 filed Nov. 25, 2015. The entire contents of the above application are hereby incorporated by reference as though fully set forth herein.

FIELD

The present invention relates to the field of animal restraints and leashes. More specifically, the present invention relates to an animal leash used in conjunction with a tactical belt.

BACKGROUND

Police, military and other law enforcement units often rely on dogs (known as K-9 units) that are specifically trained to assist such personnel in their work, such as searching or drugs and explosives, searching for lost people, looking for crime scene evidence, tracking and locating crime suspects, and protecting their handlers. In tactical situations, a handler may need to access other tactical equipment and may need to maintain control of the dog without the use of their hands. As such, many K-9 leashes provide for attachment of the leash to a tactical belt using a hook or loop system. When better control is needed, the leash is typically released from the belt using a quick release buckle. Additionally, it is important for the leash to be expandable to allow for the dog to quickly track and locate people or items of interest without being held back by their handler. Therefore, many K-9 leashes have an elastic or elastomeric member sewn between the two ends of the leash.

The quick release buckles and connectors known in the prior art are often difficult to unlatch when the dog is pulling against the buckle or connector attached to the belt. Further, the elastic or elastomeric members used in commercially available leashes are limited in how far they can expand and still maintain a reasonable length when retracted. There are situations where a dog may need to travel a longer distance from their handler in a very short period of time. As such, there is a need for a quick release leash that can be released even when the dog is pulling against the leash with full force. It is also useful for the leash to have the ability to expand to longer distances than the typical elastomeric leash models in a shorter period of time.

BRIEF SUMMARY OF THE INVENTION

It is the object of the present invention to address several challenges in previous attempts to provide an expandable dog leash by providing a multipurpose leash with a semi fixed portion that can expand to a much longer leash using a one hand pull, quick release system. The present invention is generally a leash with a non-elastomeric extendable portion; an elastomeric extendable portion; and a storage pouch. The elastomeric extendable portion is connected to the non-elastomeric portion and the non-elastomeric extendable portion is folded or rolled several turns upon itself. The storage pouch holds the non-elastomeric extendable portion in the folded or rolled relationship of its turns.

DETAILED DESCRIPTION

The leash of the present invention is designed as a multipurpose lead that has a semi-fixed length of about five feet which can expand to about a twenty-five foot dog lead/leash via a one hand pull quick release snap shackle system. Commercially available tethers lack a non elastomeric extendable portion, which is important to allow a dog to cover a long distance in a short amount of time. For example, when the dog is chasing a suspect, the speed of their handler and the length of the tether limit the dog. Although many tethers have an elastomeric portion that expands and retracts, this portion is relatively short compared to the non elastomeric extendable portion of the present invention. For example, most elastomeric portions extend about an extra 18 inches whereas the present invention allows the tether to extend to about 25 feet. The present invention has the advantage of having both an elastomeric extendable portion and a non elastomeric extendable portion wherein the non elastomeric extendable portion can be quickly released and deployed and then easily folded for storage after use in the storage sleeve. The entire tether may be stored in a storage bag.

Figure 1:
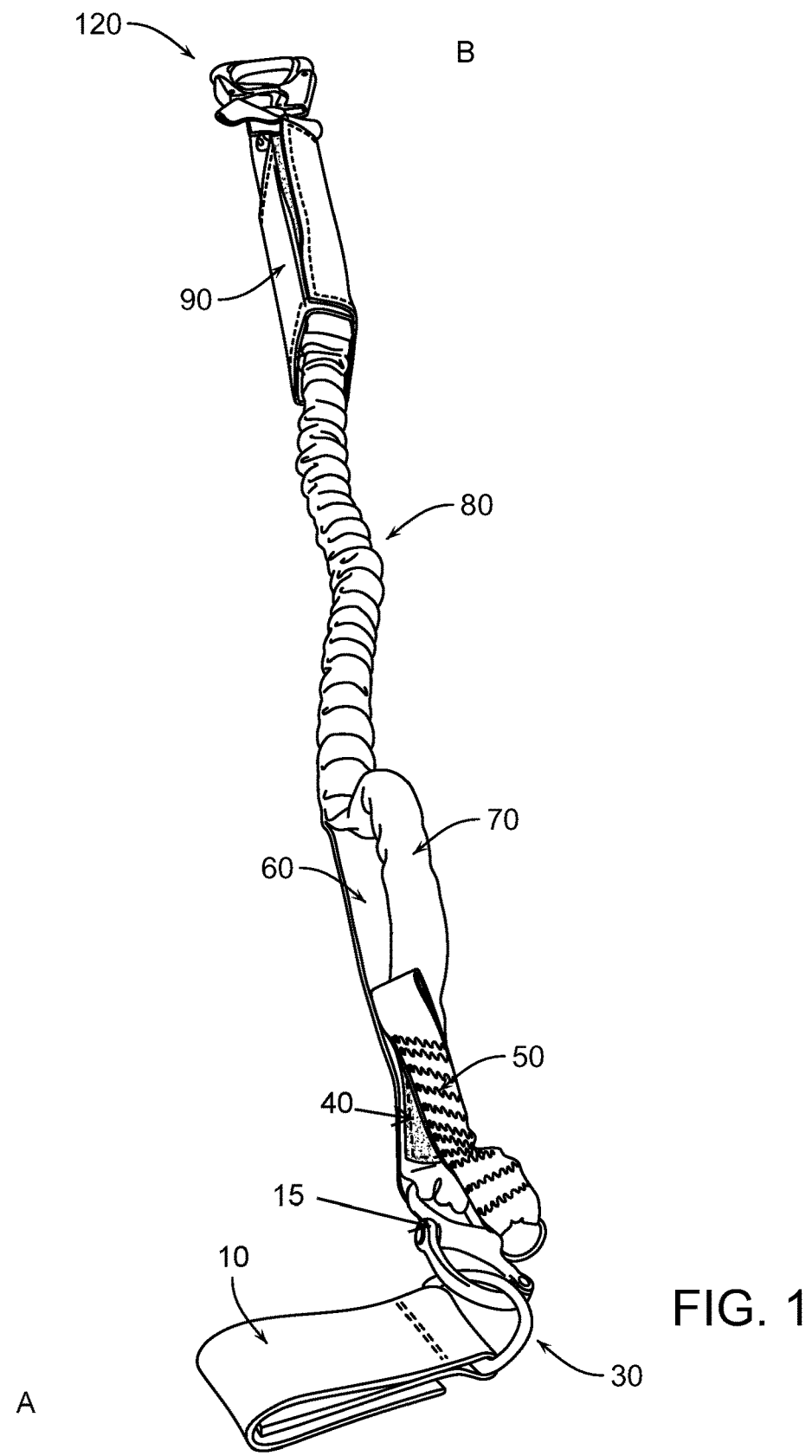
FIG. 1 is perspective view of an exemplary embodiment of the leash of the present invention.
Figure 4:
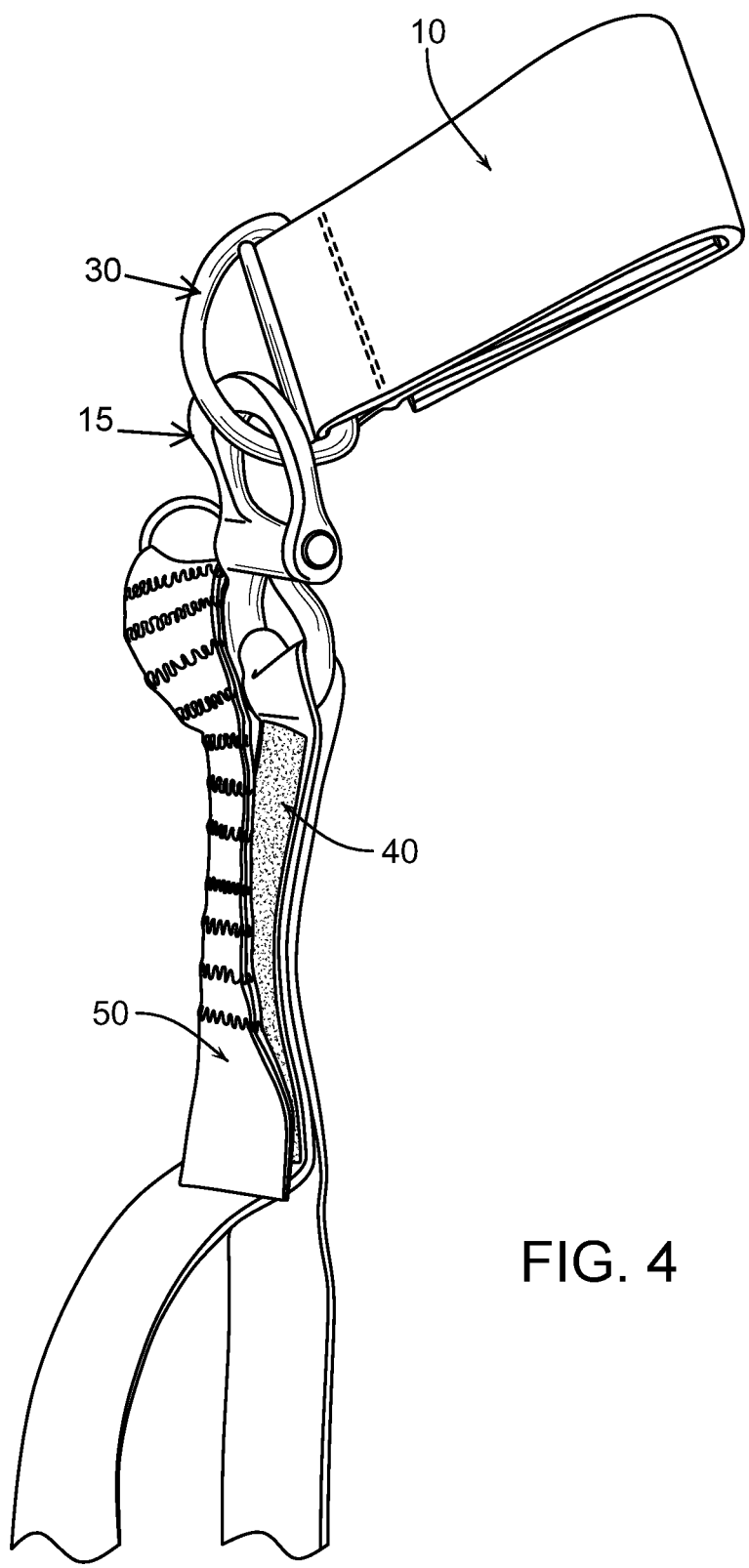
FIG. 4 is a side perspective view of the upper portion of the leash of FIG. 1.
Figure 5:
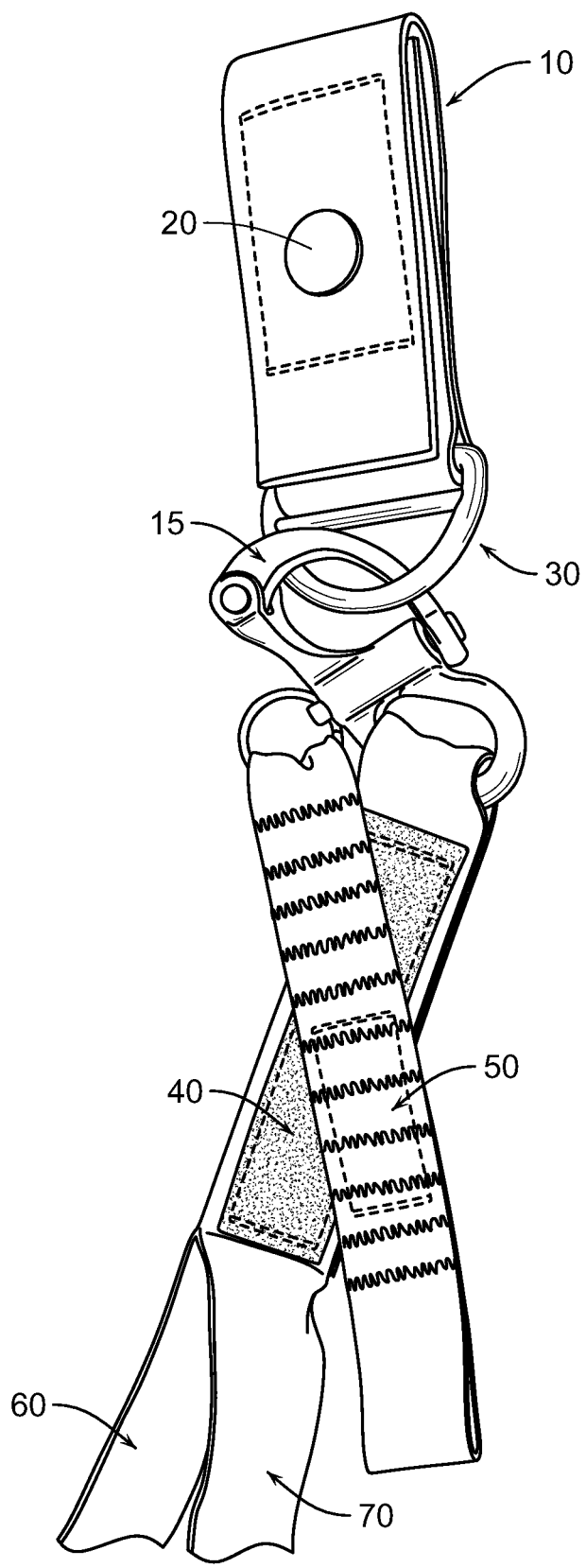
FIG. 5 is a back perspective view of the upper portion of the leash of FIG. 1.
Figure 6:
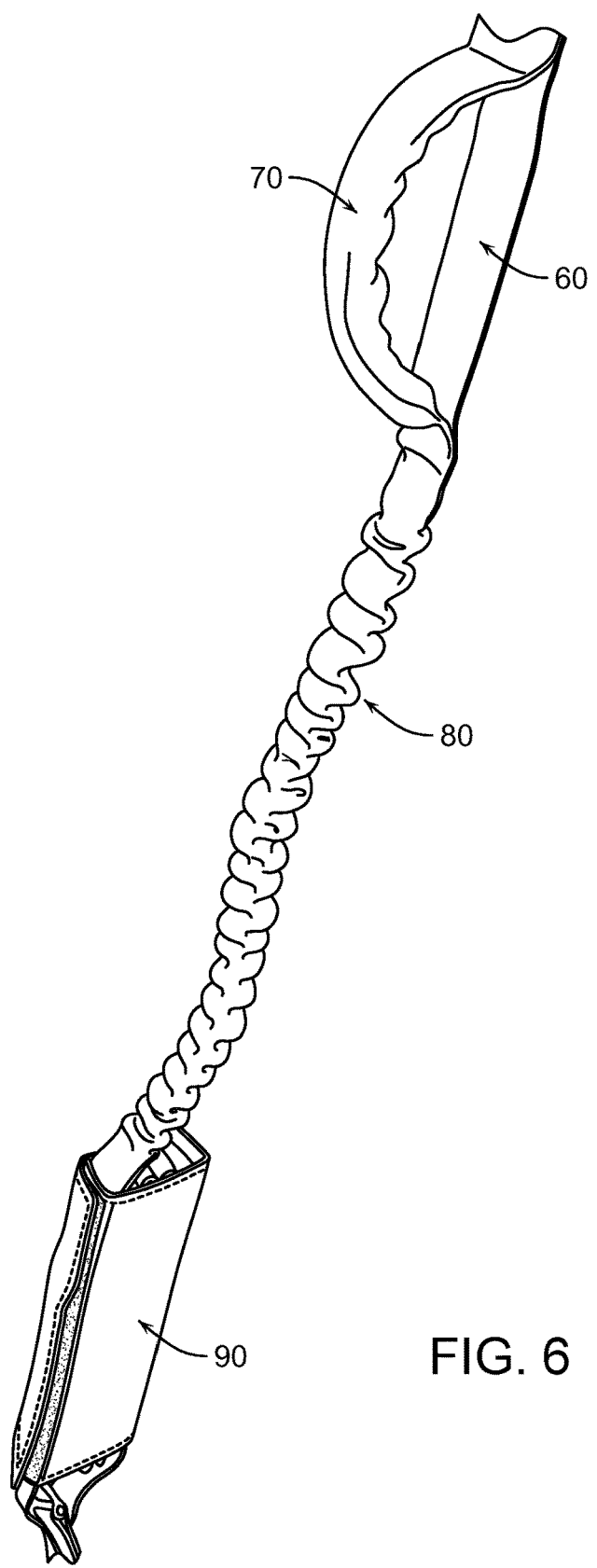
FIG. 6 is a side perspective view of the middle portion of the leash of FIG. 1.

Turning to FIG. 1, the preferred embodiment of the present invention is shown generally with a proximal end A and distal end B. As shown in further detail in FIGS. 2, 4 and 5, a tether portion 10 is connected via a D ring 30 to a quick release snap shackle 15. The snap shackle 15 works in conjunction with a hook 40 and loop 50 fastener material such as Velcro™. As shown in further detail in FIG. 9, the tether 10 is attached to a user's belt 190 using something like a snap button 20. It is contemplated that various other attachment devices known in the prior art may be used to create the snap button 20 that attaches directly to the belt 190. However, it is the placement of the quick-release snap shackle 15 that allows the handler to remove the tether 10 from the belt 190 using one hand in a fast, ripping motion. This is important in situations where the handler needs to quickly gain better control of the dog and to avoid being pulled forward at the waist when the dog pulls against the tactical belt, such as when the dog lunges forward.

Figure 2:
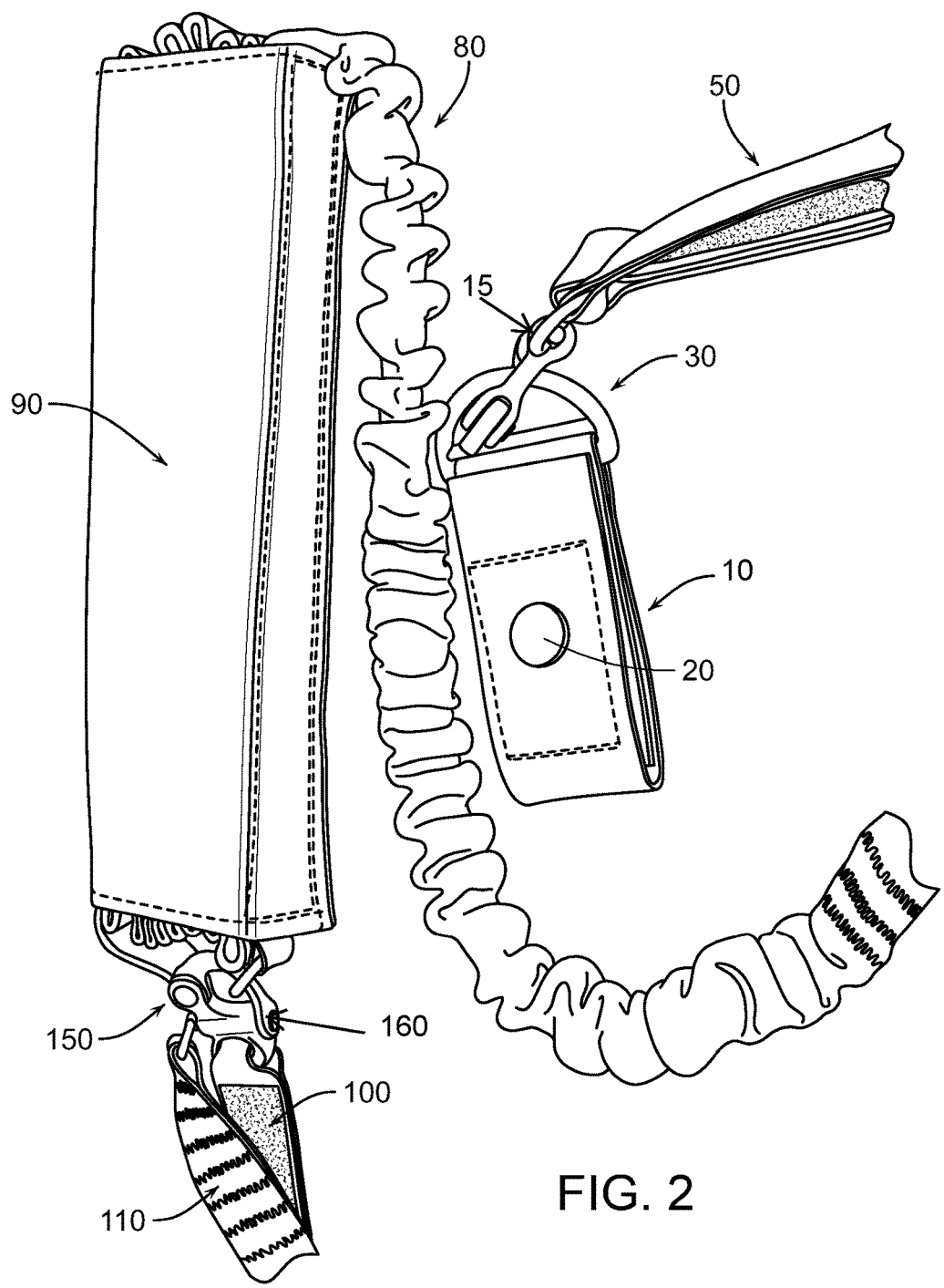
FIG. 2 is a side perspective view of portion of the collapsed leash of FIG. 1.

As shown in FIGS. 1 and 2, a fixed length non-elastomeric portion 60 has a handle 70 affixed to and extending from the non-elastomeric portion 60. with a hand-sized portion for being grasped that allows, for example, a K-9 handler a quick and firm grasp of the leash when it is both attached and not attached to a tactical belt. Just forward of the handle 70 there is an elastomeric extendable portion 80 with embedded elastic webbing that allows the leash to extend about 18 inches. Attached to the elastomeric extendable portion 80 opposite the end of the hand hold 70 is a storage pouch 90.

Figure 3:
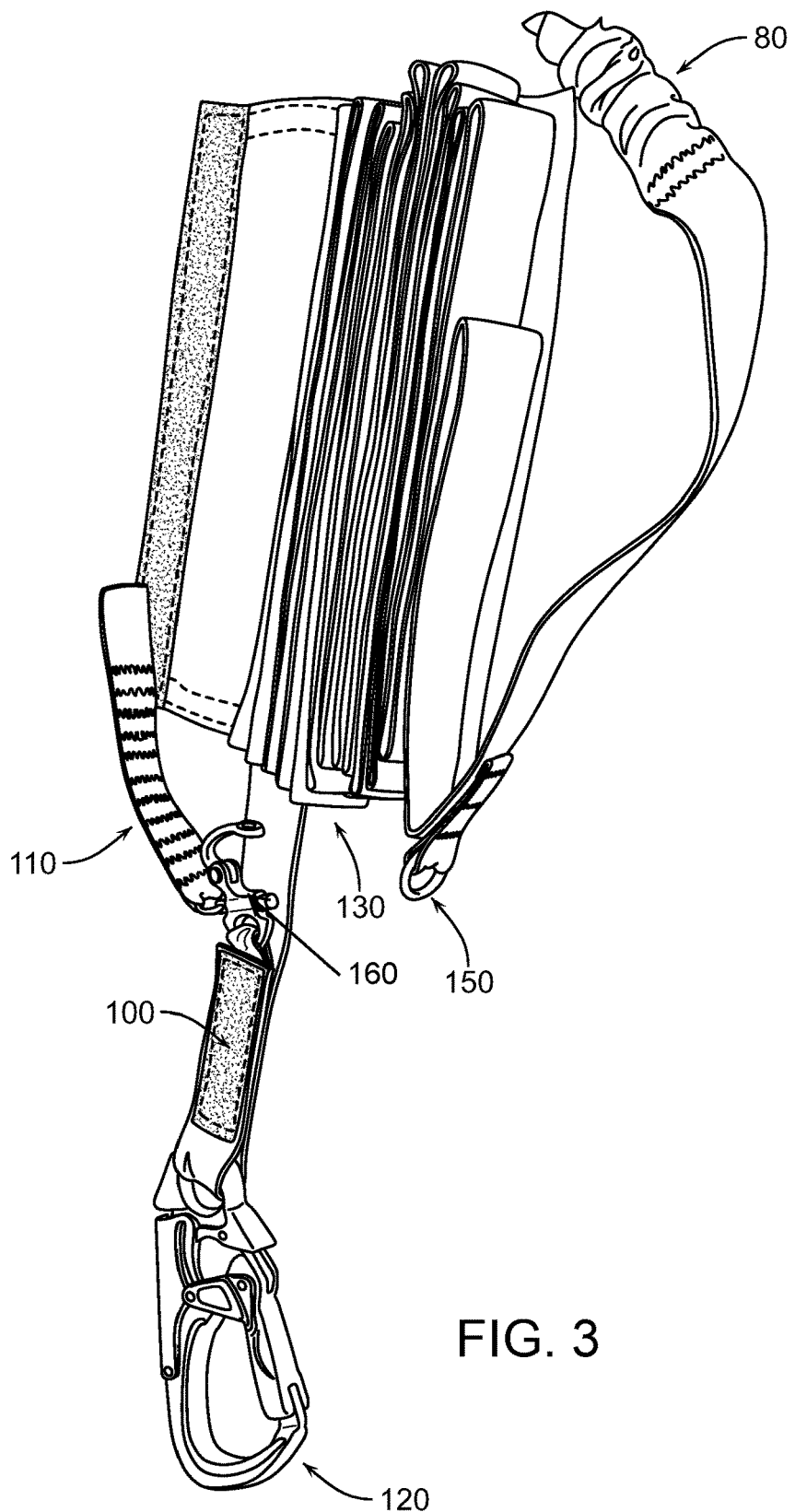
FIG. 3 is a side perspective view of a portion of the collapsed leash of FIG. 1.

Turning to FIG. 3, a non-elastomeric extendable portion 130 is housed within the pouch 90 and is folded against itself repeatedly (or alternatively could be rolled around itself) to fit within the pouch 90.

Figure 7:
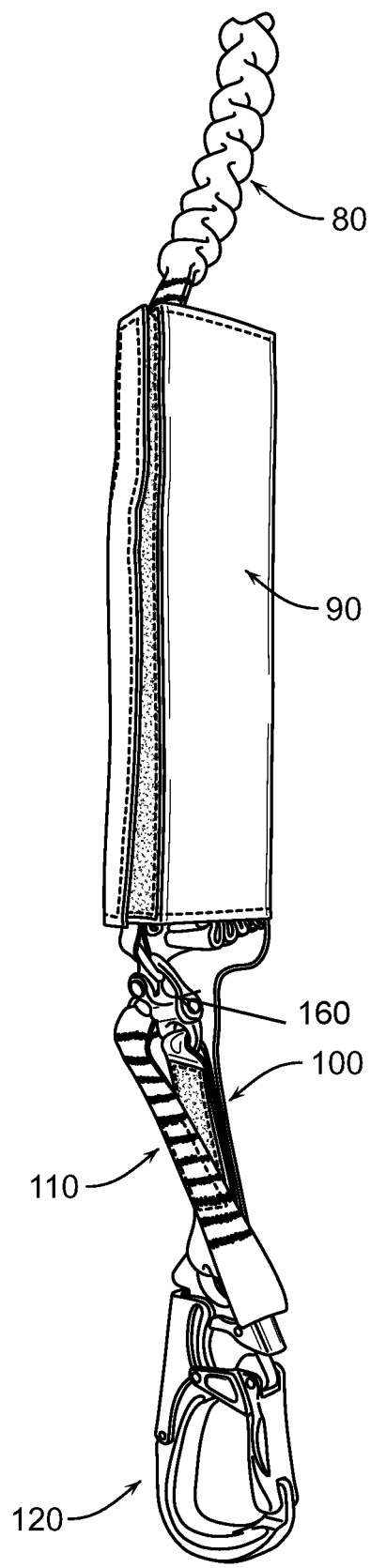
FIG. 7 is a side perspective view of the bottom portion of the least of FIG. 1.
Figure 8:
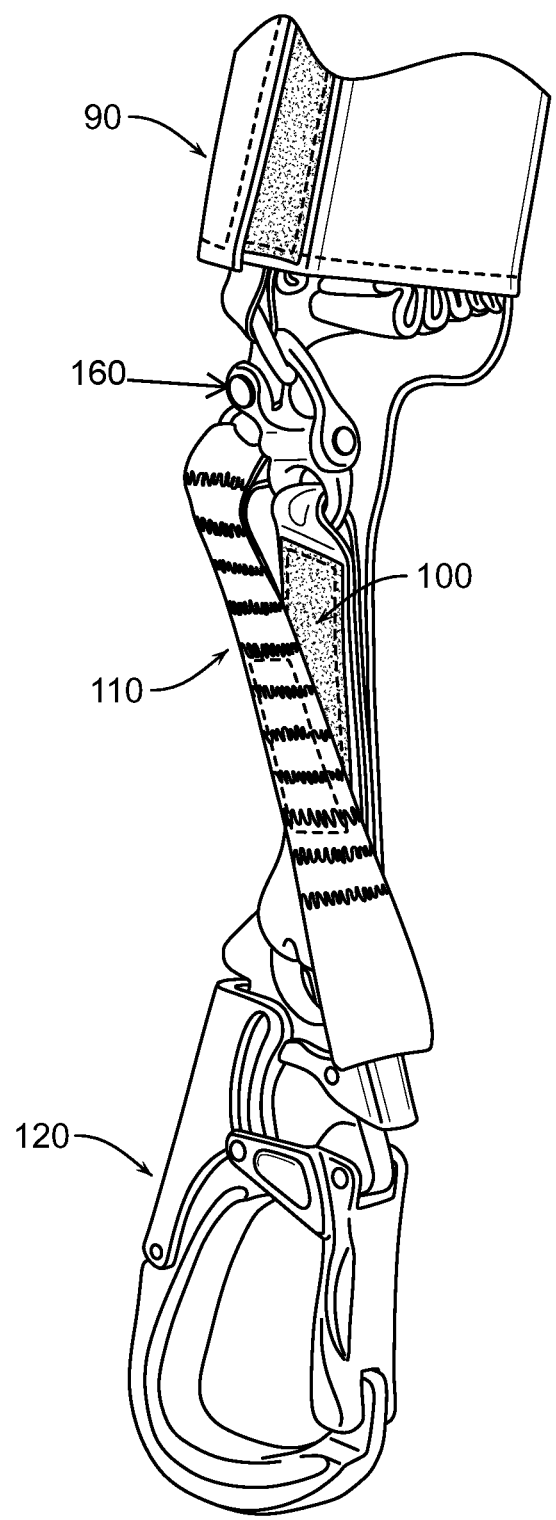
FIG. 8 is a close up side perspective view of portion of the leash shown in FIG. 7.
Figure 9:
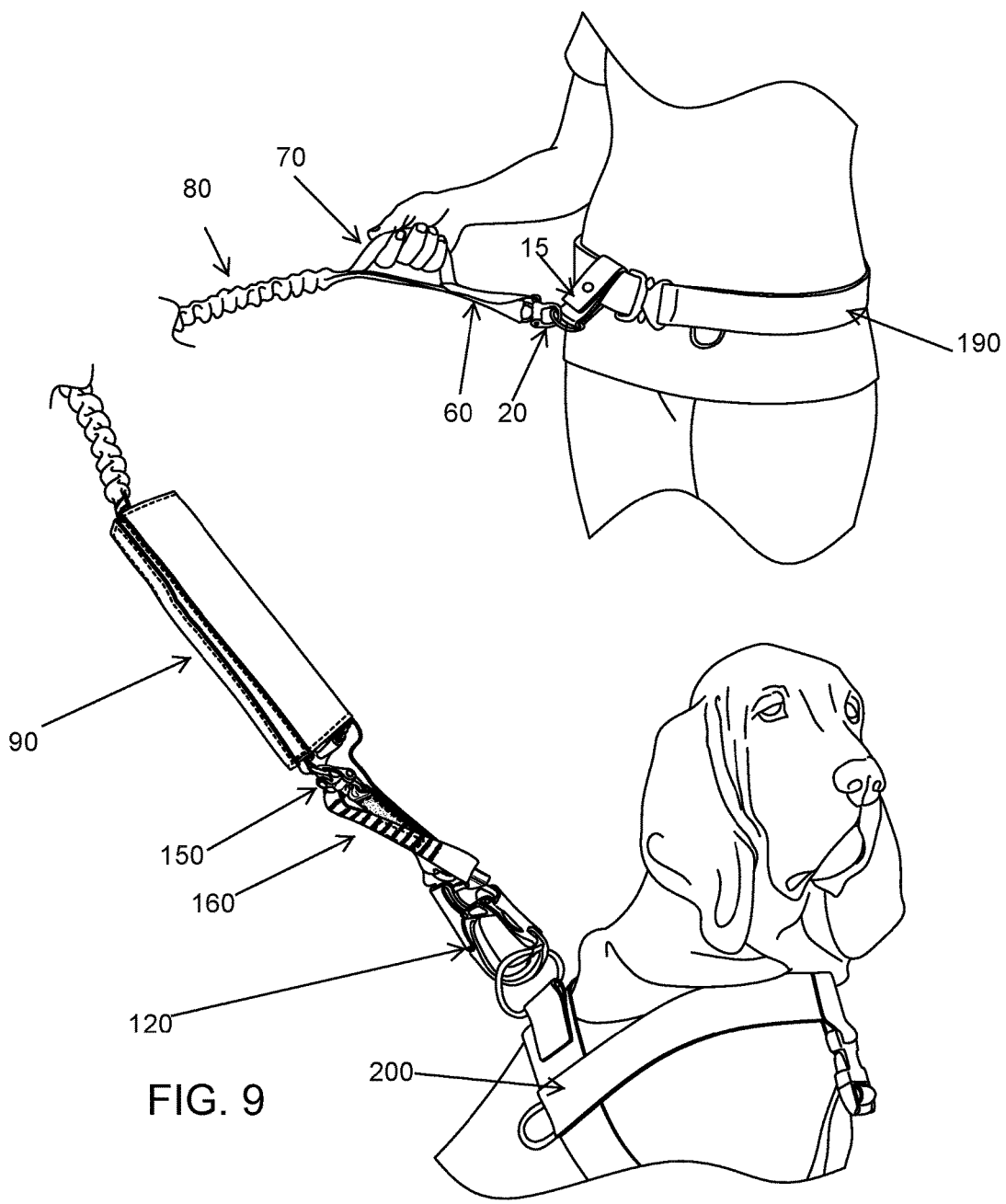
FIG. 9 is a perspective view of the leash of the present invention as used attached to a belt at one end and to the collar of a dog at the other end.

Turning to FIGS. 7, 8 and 9, the distal end B of the leash is attached to a collar (or harness) 200 around the neck (or upper body) of an animal, such as a dog, and may be attached using various attachment means such as the double lock snap hook 120 shown herein. The non-elastomeric extendable portion 130 can be released from the pouch 90 using a second one-hand pull, quick release snap shackle 160 using hook 100 and loop 110 attachment/detachment. The non-elastomeric extendable portion 130 is held in the storage sleeve 90 using a daisy chain 150 that can be released with the second one-hand pull, quick release snap shackle 160 with hook 100 and loop 110 fastener.

In the preferred embodiment, the tether's fixed portion 10, handle 70, non elastomeric extendable portion 130 and storage pouch 90 are constructed from a nylon material, although other materials may be used, including but not limited to synthetic textiles (rayon, polyester, acrylic, acetate), rope, leather, rubber and various plastics.

For the purposes of promoting an understanding of the principles of the invention, reference has been made to the preferred embodiments illustrated in the drawings, and specific language has been used to describe these embodiments. However, this specific language intends no limitation of the scope of the invention, and the invention should be construed to encompass all embodiments that would normally occur to one of ordinary skill in the art. The particular implementations shown and described herein are illustrative examples of the invention and are not intended to otherwise limit the scope of the invention in any way. For the sake of brevity, conventional aspects of the method (and components of the individual operating components of the method) may not be described in detail. Furthermore, the connecting lines, or connectors shown in the various figures presented are intended to represent exemplary functional relationships and/or physical or logical couplings between the various elements. It should be noted that many alternative or additional functional relationships, physical connections or logical connections might be present in a practical device. Moreover, no item or component is essential to the practice of the invention unless the element is specifically described as "essential" or "critical". Numerous modifications and adaptations will be readily apparent to those skilled in this art without departing from the spirit and scope of the present invention.

What is claimed is:

1. An animal leash comprising
   a. a non-elastomeric extendable portion;
   b. an elastomeric extendable portion;
   c. a storage pouch;
   d. a first tether;
   e. a first quick release snap shackle;
   f. a means to connect the first tether to a belt;
   g. a first fixed length non-elastomeric portion;
   h. a second quick release snap shackle;
   i. a second fixed length non-elastomeric portion;
   j. a means to release the non-elastomeric extendable portion from the storage pouch; and
   k. a means to connect the second fixed length non-elastomeric portion to a collar wherein the elastomeric extendable portion is connected to the non-elastomeric portion; wherein the non-elastomeric extendable portion is folded or rolled several turns upon itself;

wherein the storage pouch holds the non-elastomeric extendable portion in the folded or rolled relationship of its turns;

wherein the first quick release snap shackle connects the tether to the first fixed length non-elastomeric portion;

wherein the first fixed length non-elastomeric portion is connected to the elastomeric extendable portion;

wherein the second quick release snap shackle connects the storage pouch to the second fixed length non-elastomeric portion.

2. The leash of claim 1 further comprising a snap button fastener wherein the belt is connected to the first tether using the snap button fastener.

3. The leash of claim 1 further comprising a hand hold extending from and affixed to the first fixed length non-elastomeric portion.

4. The leash of claim 1 wherein the means to release the non-elastomeric extendable portion from the storage pouch comprises a daisy chain and a second quick release snap shackle wherein the daisy chain is released using the second quick release snap shackle used in conjunction with the detachable hook and loop fastener.

\* \* \* \* \*